United States Patent
Tirronen et al.

(10) Patent No.: US 10,743,350 B2
(45) Date of Patent: Aug. 11, 2020

(54) METHODS PROVIDING UL GRANTS INCLUDING TIME DOMAIN CONFIGURATION AND RELATED WIRELESS TERMINALS AND NETWORK NODES

(71) Applicant: Telefonaktiebolaget LM Ericsson (publ), Stockholm (SE)

(72) Inventors: Tuomas Tirronen, Helsinki (FI); Yufei Blankenship, Kildeer, IL (US); Johan Bergman, Stockholm (SE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 415 days.

(21) Appl. No.: 15/316,683

(22) PCT Filed: Sep. 8, 2016

(86) PCT No.: PCT/SE2016/050841
§ 371 (c)(1),
(2) Date: Dec. 6, 2016

(87) PCT Pub. No.: WO2017/052445
PCT Pub. Date: Mar. 30, 2017

(65) Prior Publication Data
US 2017/0273113 A1  Sep. 21, 2017

Related U.S. Application Data

(60) Provisional application No. 62/232,743, filed on Sep. 25, 2015.

(51) Int. Cl.
*H04W 74/08* (2009.01)
*H04W 4/70* (2018.01)
(Continued)

(52) U.S. Cl.
CPC ......... *H04W 74/0833* (2013.01); *H04W 4/70* (2018.02); *H04W 72/042* (2013.01);
(Continued)

(58) Field of Classification Search
CPC .... H04L 5/0037; H04L 5/0053; H04W 74/08; H04W 4/00; H04W 4/70; H04W 72/0413;
(Continued)

(56) References Cited

U.S. PATENT DOCUMENTS

| | | |
|---|---|---|
| 2010/0067468 A1 | 3/2010 | Ho et al. |
| 2012/0044897 A1* | 2/2012 | Wager .................. H04L 5/0037 370/329 |

(Continued)

FOREIGN PATENT DOCUMENTS

| | | |
|---|---|---|
| JP | 2012502567 A | 1/2012 |
| RU | 2014109025 A | 9/2015 |

(Continued)

OTHER PUBLICATIONS

International Search Report and Written Opinion of the International Searching Authority, International Application No. PCT/SE2016/050841, dated Nov. 24, 2016.
(Continued)

*Primary Examiner* — Khoa Huynh
(74) *Attorney, Agent, or Firm* — Sage Patent Group

(57) ABSTRACT

A method of operating a wireless terminal may include transmitting a random access preamble of a random access procedure from the wireless terminal to a node of a radio access network. After transmitting the random access preamble, a random access response of the random access procedure may be received from the node of the radio access network, with the random access response including an Uplink grant for a Message 3 uplink communication of the random access procedure. The UL grant may include a time
(Continued)

domain configuration associated with the Message 3 uplink communication. The time domain configuration may include a repetition factor that defines a number of repetitions across subframes for the Message 3 uplink communication, and/or Transmission Time Interval information for the Message 3 uplink communication. Related wireless terminals and base stations are also discussed.

33 Claims, 5 Drawing Sheets

(51) Int. Cl.
| | | |
|---|---|---|
| | *H04W 72/04* | (2009.01) |
| | *H04W 72/14* | (2009.01) |
| | *H04W 76/27* | (2018.01) |
| | *H04W 88/02* | (2009.01) |
| | *H04W 88/08* | (2009.01) |
| | *H04W 92/20* | (2009.01) |

(52) U.S. Cl.
CPC ... *H04W 72/0413* (2013.01); *H04W 72/0446* (2013.01); *H04W 72/14* (2013.01); *H04W 76/27* (2018.02); *H04W 88/02* (2013.01); *H04W 88/08* (2013.01); *H04W 92/20* (2013.01)

(58) Field of Classification Search
CPC ........... H04W 72/042; H04W 72/0446; H04W 72/12; H04W 72/14; H04W 74/0833; H04W 76/27; H04W 88/02; H04W 88/08; H04W 92/20
See application file for complete search history.

(56) References Cited

U.S. PATENT DOCUMENTS

| | | | |
|---|---|---|---|
| 2015/0173105 A1 | 6/2015 | Bergstrom et al. | |
| 2016/0165640 A1* | 6/2016 | Yang | H04W 74/08 370/336 |
| 2017/0279646 A1* | 9/2017 | Yi | H04L 5/0053 |

FOREIGN PATENT DOCUMENTS

| | | |
|---|---|---|
| WO | WO 2013022391 A1 | 2/2013 |
| WO | WO 2015/012664 A1 | 1/2015 |
| WO | WO 2015/116732 A1 | 8/2015 |

OTHER PUBLICATIONS

3GPP, Technical Specification—"3rd Generation Partnership Project; Technical Specification Group Radio Access Network; Evolved Universal Terrestrial Radio Access (E-UTRA); Physical channels and modulation (Release 12)", 3GPP TS 36.211 V12.0.0 (Dec. 2013), 120 pp.

3GPP, Technical Specification—"3rd Generation Partnership Project; Technical Specification Group Radio Access Network; Evolved Universal Terrestrial Radio Access (E-UTRA); Multiplexing and channel coding (Release 12)", 3GPP TS 36.212 V12.0.0 (Dec. 2013), 88 pp.

3GPP, Technical Specification—"3rd Generation Partnership Project; Technical Specification Group Radio Access Network; Evolved Universal Terrestrial Radio Access (E-UTRA); Physical layer procedures (Release 12)", 3GPP TS 36.213 V12.0.0 (Dec. 2013), 186 pp.

3GPP, Technical Specification—"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0 (Mar. 2015), 77 pp.

3GPP, Technical Specification—"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0 (Mar. 2015), 445 pp.

Ericsson, R1-153724, "Physical layer timing for MTC", Agenda Item: 7.2.1.1., Document for: Discussion and Decision, 3GPP TSG RAN WG1 Meeting #82, Beijing, China, Aug. 24-28, 2015, 4 pp.

Ericsson, R1-153739, "Random access for MTC", Agenda Item: 7.2.1.7, Document for: Discussion and Decision, 3GPP TSG RAN WG1 Meeting #82, Beijing, China, Aug. 24-28, 2015, 4 pp.

Ericsson, Tdoc R2-153717, "Random access for Rel-13 low complexity and enhanced coverage UEs", Agenda Item: 7.4.3, Document for: Discussion, Decision, 3GPP TSG-RAN WG2 #91, Beijing, P.R. China, Aug. 24-28, 2015, 7 pp.

Russian Office Action dated Jan. 16, 2019 for Russian Patent Application 2018115187 (PCT/SE2016/050841) (including English translation), 14 total pages.

Japanese Office Action dated Feb. 26, 2019 for Japanese Patent Application No. 2018-515019, 3 pages.

Huawei, HiSilicon; 3GPP TSG RAN WG2 Meeting #91, R2-153357, Consideration on RACH procedure in coverage enhancement, Beijing, China, Aug. 24-28, 2015, 5 pages.

Ericsson; 3GPP TSG-RAN WG2 #90, Tdoc R2-152649, Random access for Rel-13 low complexity and coverage enhanced UEs, Fukuoka, Japan, May 25-29, 2015, 7 pages.

* cited by examiner

METHODS PROVIDING UL GRANTS INCLUDING TIME DOMAIN CONFIGURATION AND RELATED WIRELESS TERMINALS AND NETWORK NODES

CROSS REFERENCE TO RELATED APPLICATIONS

This application is a 35 U.S.C. § 371 national stage application of PCT International Application No. PCT/SE2016/050841, filed on Sep. 8, 2016, which itself claims the benefit of U.S. provisional Patent Application No. 62/232,743, filed Sep. 25, 2015, the disclosure and content of both of which are incorporated by reference herein in their entireties.

TECHNICAL FIELD

The present disclosure is directed to wireless communications and, more particularly, to random access procedures and related wireless terminals and base stations.

BACKGROUND

In a typical cellular radio system, wireless terminals communicate via a radio access network (RAN) with one or more core networks. The RAN covers a geographical area which is divided into cell areas, with each cell area being served by a base station. A cell area is a geographical area where radio coverage is provided by the base station at a base station site. The base stations communicate through wireless radio communication channels with wireless terminals within range of the base station subsystems.

Communications for machine-type communication (MTC) wireless terminals is a growing area of communications in radio access networks. Such MTC wireless terminals may be used to provide wirelessly networked sensors, meters, etc. In such applications, MTC wireless terminals may be expected to transmit relatively small amounts of uplink (UL) data relatively infrequently.

Because MTC wireless terminals may be located in areas (e.g., basements) with unfavorable radio conditions, an MTC wireless terminal may have difficulty transmitting and/or receiving communications of a conventional random access procedure.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

According to some embodiments of inventive concepts, a method of operating a wireless terminal may include transmitting a random access preamble of a random access procedure from the wireless terminal to a node of a radio access network. After transmitting the random access preamble, a random access response of the random access procedure may be received from the node of the radio access network, with the random access response including an Uplink grant for a Message 3 uplink communication of the random access procedure. The UL grant may include a time domain configuration associated with the Message 3 uplink communication. The time domain configuration may include a repetition factor that defines a number of repetitions across subframes for the Message 3 uplink communication, and/or Transmission Time Interval information for the Message 3 uplink communication. Related wireless terminals and base stations are also discussed.

The UL grant may further include a frequency domain configuration associated with the Message 3 uplink communication. The frequency domain configuration may include a resource block assignment that indicates Physical Resource Block resources for the Message 3 uplink communication. The resource block assignment may include: an UL narrowband index and a set of PRB pairs within the narrowband; and/or a frequency hopping configuration of the Message 3 uplink communication.

The random access response may include the repetition factor for the Message 3 uplink communication of the random access procedure. In addition, a number of repeated transmissions of the Message 3 uplink communication may be provided from the wireless terminal to the node of the radio access network wherein the number of repeated transmissions is based on the repetition factor for the Message 3 uplink communication. The number of repeated transmissions may be based on the repetition factor for the Message 3 uplink communication and a number of repeated transmissions of the random access preamble, and/or the number of repeated transmissions may be based on the repetition factor for the Message 3 uplink communication and a coverage enhancement level of a downlink channel from the node to the wireless terminal. The number of repeated transmissions may be based on the repetition factor for the Message 3 uplink communication and a number of repeated transmissions of the random access response and/or based on the repetition factor for the Message 3 uplink communication and a number of repeated transmissions of control information for the random access response.

The random access response may include information defining a time and/or frequency location associated with the Message 3 uplink communication. Transmission of the Message 3 uplink communication may be provided based on the information defining the time and/or frequency location from the random access response. Information defining the time and/or frequency location may define a time and/or frequency location in a subframe for the Message 3 uplink communication.

The information defining the time and/or frequency location may define one or more of: a starting subframe among a set of subframes that carries the Message 3 uplink transmission; a number of repetitions across subframes for carrying the Message 3 uplink transmission; a frequency location in a subframe for the Message 3 uplink transmission, where the frequency location is provided by a narrowband index or a PRB pair index; a number of PRB pairs occupied by the Message 3 uplink transmission; a resource block allocation information of the Message 3 uplink transmission; and/or a frequency hopping configuration of the Message 3 uplink transmission.

The random access response may include configuration information of a control channel for a Message 4 downlink communication. The control channel associated with the Message 4 downlink communication may be received based on the configuration information, and the Message 4 downlink communication may be received from the node based on the control channel. The configuration information may include a time and/or frequency resource definition that provides one or more of: a starting subframe among a set of subframes that carries the control channel associated with the Message 4 downlink communication; a number of repetitions across subframes for carrying the control channel; a frequency location in a subframe for the control channel, where the frequency location is provided by a narrowband index or a PRB pair index; a number of PRB pairs that are used for the control channel; a resource block assignment information of the control channel; and/or a frequency hopping configuration of the control channel.

The random access response may further include a timing advance command and a temporary identification for the wireless terminal, and the UL grant may be included between the timing advance command and the temporary identification for the wireless terminal. The random access response may include six octets, the timing advance command may be included in a portion of a first of the six octets and a portion of a second of the six octets, the UL grant may be included in a portion of the second of the six octets and in third and fourth octets of the six octets, and the temporary identification for the wireless terminal may be included in fifth and sixth octets of the six octets.

Transmitting the random access preamble may include transmitting the random access preamble via a physical random access channel PRACH, and/or receiving the random access response may include receiving the random access response via a physical downlink shared channel PDSCH.

According to some other embodiments of inventive concepts, a method of operating a node of a radio access network may include receiving a random access preamble of a random access procedure from the wireless terminal. Responsive to receiving the random access preamble, a random access response of the random access procedure may be transmitted to the wireless terminal, the random access response may include an uplink grant for a Message 3 uplink communication of the random access procedure. The UL grant may include a time domain configuration associated with the Message 3 uplink communication, and the time domain configuration may include: a repetition factor that defines a number of repetitions across subframes for the Message 3 UL communication; or Transmission Time Interval information for the Message 3 UL communication.

The UL grant may further include a frequency domain configuration associated with the Message 3 uplink communication. The frequency domain configuration may include: a resource block assignment that indicates Physical Resource Block resources for the Message 3 uplink communication, with the resource block assignment including a UL narrowband index and a set of PRB pairs within the narrowband; and/or a frequency hopping configuration of the Message 3 uplink communication.

The random access response may include the repetition factor for the Message 3 uplink communication of the random access procedure, and a number of repeated transmissions of the Message 3 uplink communication may be received from the wireless terminal wherein the number of repeated transmissions is based on the repetition factor for the Message 3 uplink communication. The number of repeated transmissions may be based on the repetition factor for the Message 3 uplink communication and a number of repeated transmissions of the random access preamble, and/or the number of repeated transmissions may be based on the repetition factor for the Message 3 uplink communication and a coverage enhancement level of a downlink channel from the node to the wireless terminal.

The random access response may include information defining a time and/or frequency location associated with a Message 3 uplink communication. The method may further include receiving a Message 3 uplink communication based on the information defining the time and/or frequency location from the random access response. Information defining the time and/or frequency location may define a time and/or frequency location in a subframe for the Message 3 uplink communication. Information defining the time and/or frequency location may defines one or more of: a starting subframe among a set of subframes that carries the Message 3 uplink transmission; a number of repetitions across subframes for carrying the Message 3 uplink transmission; a frequency location in a subframe for the Message 3 uplink transmission, where the frequency location is provided by a narrowband index or a PRB pair index; a number of PRB pairs occupied by the Message 3 uplink transmission; a resource block allocation information of the Message 3 uplink transmission; and/or a frequency hopping configuration of the Message 3 uplink transmission.

The random access response may include configuration information of a control channel for a Message 4 downlink communication. The control channel associated with the Message 4 downlink communication may be transmitted to the wireless terminal based on the configuration information, and the Message 4 downlink communication may be transmitted to the wireless terminal based on the control channel. The configuration information may include a time and/or frequency resource definition that provides one or more of: a starting subframe among a set of subframes that carries the control channel associated with the Message 4 downlink communication; a number of repetitions across subframes for carrying the control channel; a frequency location in a subframe for the control channel, where the frequency location is provided by a narrowband index or a PRB pair index; a number of PRB pairs that are used for the control channel; a resource block assignment information of the control channel; and/or a frequency hopping configuration of the control channel.

The random access response may further include a timing advance command and a temporary identification for the wireless terminal, and the UL grant may be included between the timing advance command and the temporary identification for the wireless terminal. The random access response may include six octets, the timing advance command may be included in a portion of a first of the six octets and a portion of a second of the six octets, the UL grant may be included in a portion of the second of the six octets and in third and fourth octets of the six octets, and the temporary identification for the wireless terminal may be included in fifth and sixth octets of the six octets.

The random access response may further include a timing advance command, a temporary identification for the wireless terminal, and/or a modulation and coding scheme for the Message 3 uplink communication.

Receiving the random access preamble may include receiving the random access preamble via a physical random access channel, and/or transmitting the random access response may include transmitting the random access response via a physical downlink shared channel.

According to still other embodiments of inventive concepts, a wireless terminal may be adapted to transmit a random access preamble of a random access procedure from the wireless terminal to a node of a radio access network. The wireless terminal may also be adapted to receive a random access response of the random access procedure from the node of the radio access network after transmitting the random access preamble. The random access response may include an Uplink grant for a Message 3 uplink communication of the random access procedure. The UL grant include a time domain configuration associated with the Message 3 uplink communication, and the time domain configuration may include: a repetition factor that defines a number of repetitions across subframes for the Message 3 uplink communication; and/or Transmission Time Interval information for the Message 3 uplink communication.

According to yet other embodiments of inventive concepts, a wireless terminal may include a transceiver configured to provide wireless communication with a node of a radio access network, and a processor coupled with the transceiver. The processor may be configured to transmit and/or receive communications to/from the node through the transceiver. The processor may be further configured to transmit a random access preamble of a random access procedure through the transceiver to a node of a radio access network. The processor may also be configured to receive a random access response of the random access procedure from the node of the radio access network through the transceiver after transmitting the random access preamble. The random access response may include an Uplink grant for a Message 3 uplink communication of the random access procedure. The UL grant may include a time domain configuration associated with the Message 3 uplink communication, and the time domain configuration may include: a repetition factor that defines a number of repetitions across subframes for the Message 3 uplink communication; and/or Transmission Time Interval information for the Message 3 uplink communication.

According to further embodiments of inventive concepts, a wireless terminal may include a random access preamble transmission module adapted to transmit a random access preamble of a random access procedure from the wireless terminal to a node of a radio access network. The wireless terminal may also include a random access response reception module adapted to receive a random access response of the random access procedure from the node of the radio access network after transmitting the random access preamble. The random access response may include an Uplink grant for a Message 3 uplink communication of the random access procedure. The UL grant may include a time domain configuration associated with the Message 3 uplink communication. The time domain configuration may include: a repetition factor that defines a number of repetitions across subframes for the Message 3 uplink communication; and/or Transmission Time Interval information for the Message 3 uplink communication.

According to still further embodiments of inventive concepts, a node of a radio access network may be adapted to receive a random access preamble of a random access procedure from the wireless terminal. The node may be further adapted to transmit a random access response of the random access procedure to the wireless terminal responsive to receiving the random access preamble. The random access response may include an uplink grant for a Message 3 uplink communication of the random access procedure. The UL grant may include a time domain configuration associated with the Message 3 uplink communication, and the time domain configuration may include: a repetition factor that defines a number of repetitions across subframes for the Message 3 UL communication; or Transmission Time Interval information for the Message 3 UL communication.

According to yet further embodiments of inventive concepts, a node of a wireless communication network may include a transceiver configured to provide wireless communication with a plurality of wireless terminals in a coverage area of the node, and a processor coupled to the transceiver. The processor may be configured to transmit and/or receive communications to/from wireless terminal through the transceiver. The processor may be configured to receive a random access preamble of a random access procedure from the wireless terminal through the transceiver. The processor may also be configured to transmit a random access response of the random access procedure through the transceiver to the wireless terminal responsive to receiving the random access preamble. The random access response may include an uplink grant for a Message 3 uplink communication of the random access procedure. The UL grant may include a time domain configuration associated with the Message 3 uplink communication, and the time domain configuration may include: a repetition factor that defines a number of repetitions across subframes for the Message 3 UL communication; or Transmission Time Interval information for the Message 3 UL communication.

According to more embodiments of inventive concepts, a node of a radio access network may include a random access preamble reception module adapted to receive a random access preamble of a random access procedure from the wireless terminal. The node may also include a random access response transmission module adapted to transmit a random access response of the random access procedure to the wireless terminal responsive to receiving the random access preamble. The random access response may include an uplink grant for a Message 3 uplink communication of the random access procedure. The UL grant may include a time domain configuration associated with the Message 3 uplink communication, and the time domain configuration may include: a repetition factor that defines a number of repetitions across subframes for the Message 3 UL communication; or Transmission Time Interval information for the Message 3 UL communication.

Some embodiments of inventive concepts may thus provide improved communications for MTC devices without changing a MAC random access response format and/or without extending a UL grant size. Flexibility may be provided to indicate a repetition factor and/or a time/frequency location for Msg3. Moreover, location and/or repetition factor information may be provided for a Msg4 control channel so that an Msg4 may be scheduled.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE, user equipment node, mobile terminal, etc.) can include any device that receives data from and/or transmits data to a communication network, and may include, but is not limited to, a mobile telephone ("cellular" telephone), laptop/portable computer, pocket computer, hand-held computer, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as base station (also referred to as a eNodeB, eNB, etc.) and wireless terminal (also referred to as a mobile station, mobile terminal, UE, etc.) should be considering non-limiting and does not imply a certain hierarchical relation between the two. In general, a base station or "eNodeB" could be considered as a first device and a wireless terminal or "UE" could be considered as a second device, and these two devices may communicate with each other over some radio channel.

Figure 1:
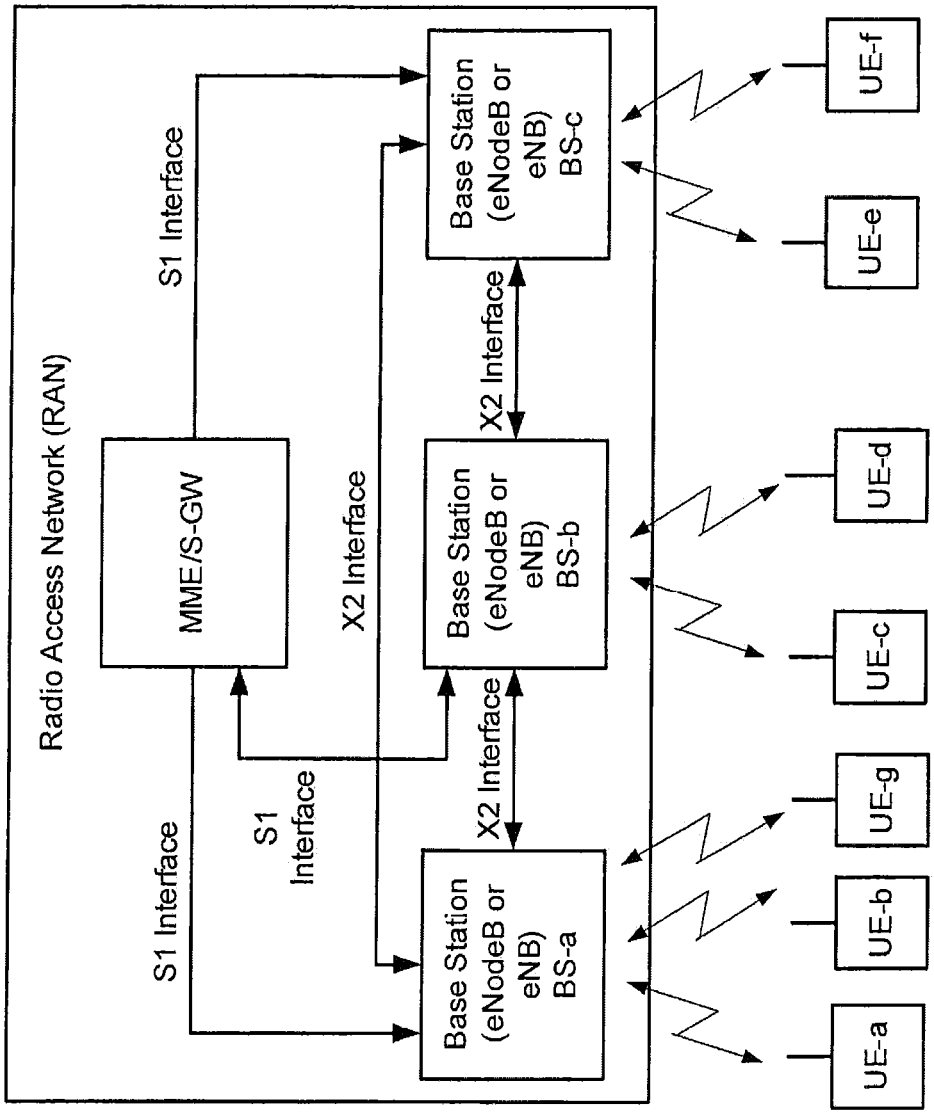
FIG. 1 is a block diagram illustrating base stations of a radio access network in communication with wireless terminals according to some embodiments of inventive concepts.

FIG. 1 is a block diagram illustrating a Radio Access Network (RAN) according to some embodiments of present inventive concepts. As shown, communications between a plurality of base stations BS-a, BS-b, and BS-c may be provided using respective X2 Interfaces, and communications between base stations and one or more core network nodes MME/S-GW may be provided using respective S1 interfaces. Each base station BS may communicate over a wireless radio interface (including uplinks and downlinks) with respective wireless terminals UEs in a respective cell or cells supported by a base station. By way of example, base station BS-a is shown in communication with wireless terminals UE-a, UE-b, and UE-g, base station BS-b is shown in communication with wireless terminals UE-c and UE-d, and base station BS-c is shown in communication with wireless terminals UE-e and UE-f.

Figure 2:
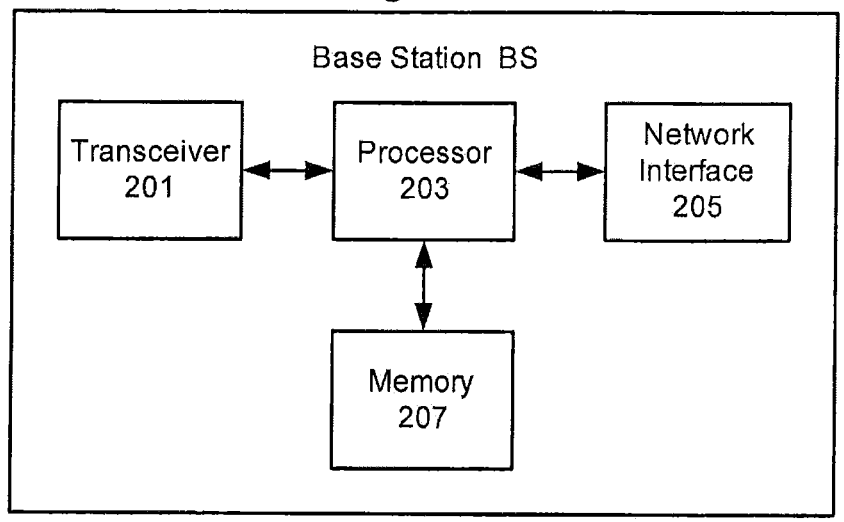
FIG. 2 is a block diagram illustrating a base station of FIG. 1 according to some embodiments of inventive concepts.

FIG. 2 is a block diagram illustrating elements of a base station BS (also referred to as an eNB, eNodeB, an evolved NodeB, a radio base station, a RAN node, etc.) of FIG. 1. As shown, a base station BS may include a transceiver circuit 201 (also referred to as a transceiver) configured to provide radio communications with a plurality of wireless terminals, a network interface circuit 205 (also referred to as a network interface) configured to provide communications with other base stations of the RAN (e.g., over the X2 interface), and a processor circuit 203 (also referred to as a processor) coupled to the transceiver circuit and the network interface circuit, and a memory circuit 207 coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided. When elements of different base stations are discussed below, elements thereof may be distinguished by appending respective letters (e.g., "-a", "-b", etc.) to the element numbers (e.g., "201", "203", "205", and "207"). For example, base station BS-a of FIG. 1 may include transceiver 201-*a*, processor 203-*a*, network interface 205-*a* and memory 207-*a*, and base station BS-b of FIG. 1 may include transceiver 201-*b*, processor 203-*b*, network interface 205-*b*, and memory 207-*b*.

Figure 3:
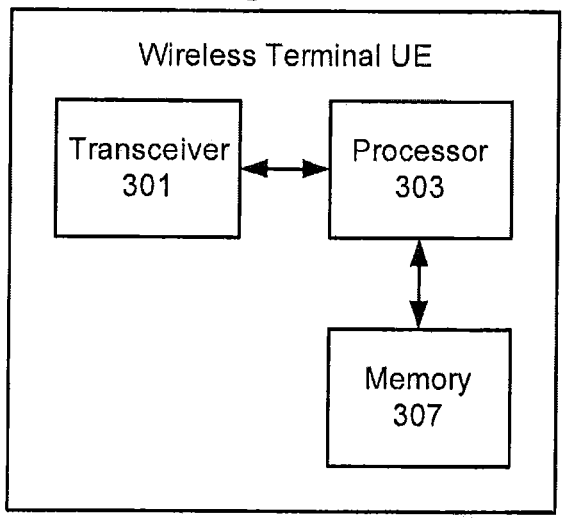
FIG. 3 is a block diagram illustrating a wireless terminal of FIG. 1 according to some embodiments of inventive concepts.

FIG. 3 is a block diagram illustrating elements of a wireless terminal UE (also referred to as a mobile terminal, mobile station, a UE, a user equipment, a user equipment node, etc.) of FIG. 1. As shown, a wireless terminal UE may include a transceiver circuit 301 (also referred to as a transceiver) configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 403 causes the processor circuit to perform operations according to embodiments disclosed herein. According to other embodiments, processor circuit 303 may be defined to include memory so that a memory circuit is not separately provided. When elements of different wireless terminals are discussed below, elements thereof may be distinguished by appending respective letters (e.g., "-a", "-b", etc.) to the element numbers (e.g., "301", "303", and "305"). For example, wireless terminal UE-a of FIG. 1 may include transceiver 301-*a*, processor 303-*a*, and memory 307-*a*, and wireless terminal UE-b of FIG. 1 may include transceiver 301-*b*, processor 303-*b*, and memory 307-*b*.

Figure 4:
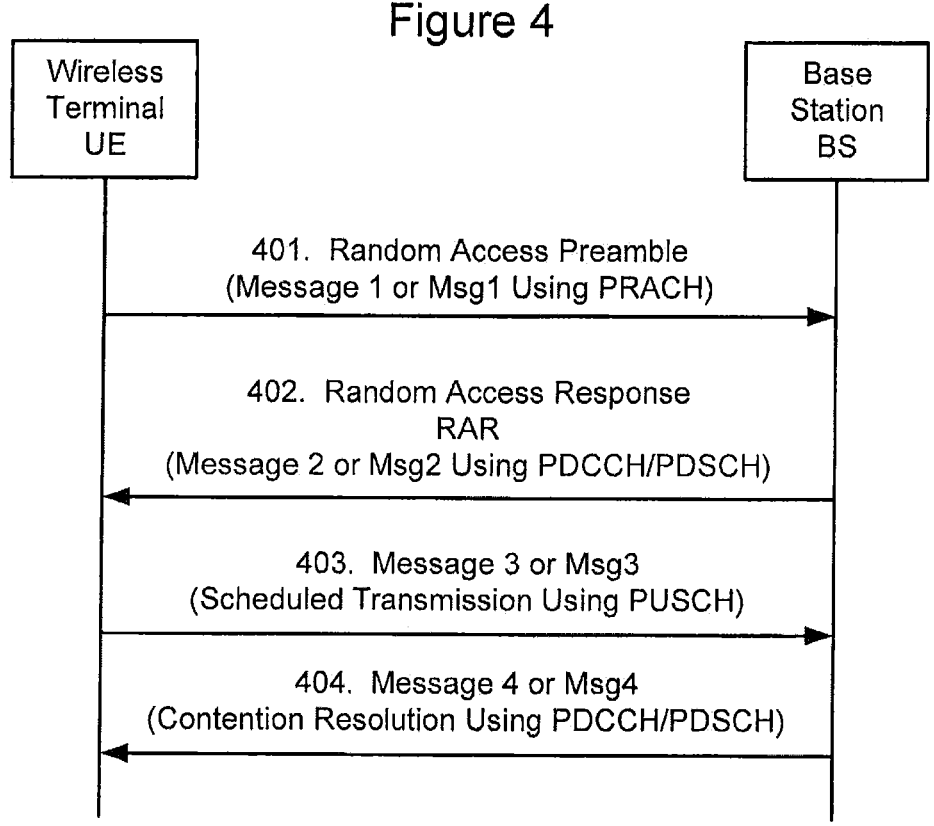
FIG. 4 is a message diagram illustrating communications between a base station and a wireless terminal.

FIG. 4 is a message diagram illustrating messages transmitted between a wireless terminal UE and a base station BS for a contention based random access procedure. Such a Random Access Procedure, for example, may be initiated by the wireless terminal UE to initiate attachment before RRC (Radio Resource Control) connection. During a random access procedure at operation 401, wireless terminal UE processor 303 may transmit a Random Access Preamble (Msg1) through transceiver 301 using a Physical Random Access Channel (PRACH). The wireless terminal UE processor 303 may randomly select the random access preamble from a set of available random access preambles. Moreover, wireless terminal UE processor 303 may transmit the Random Access Preamble without any prior allocation.

Responsive to receiving the random access preamble at operation 401 through transceiver 201, base station BS processor 203 may transmit a Random Access Response RAR (Msg2) through transceiver 201 at operation 402. More particularly, the Random Access Response RAR may include an uplink grant for a subsequent Message 3 to be transmitted by wireless terminal UE. Responsive to receiving Message 4 of operation 402 through transceiver 301, wireless terminal UE processor 303 may transmit Message 3 (e.g., an RRC connection request) through transceiver 301 at operation 403 using the uplink grant indicated in the RAR of operation 402. Responsive to receiving Message 3 of operation 403 through transceiver 201, base station BS processor 203 may transmit Message 4 through transceiver 201 at operation 404 to provide contention resolution and/or to provide a subsequent uplink grant.

As discussed in greater detail below, a format of the RAR of operation 402 may be different for different types of wireless terminals. For a conventional mobile wireless terminal UE (e.g., a cellular radiotelephone, a smartphone, a tablet computer, a laptop computer, etc.), the RAR of operation 402 may include uplink grant information for the subsequent uplink Message 3 of operation 403 without including repetition information for uplink Message 3 of operation 403 and/or without including information regarding the downlink Message 4 of operation 404. In contrast, an RAR of operation 402 for a MTC (machine-type communication) wireless terminal UE may include repetition information for uplink message 3 of operation 403 and/or downlink grant information for the subsequent downlink Message 4 of operation 404.

Figure 5:
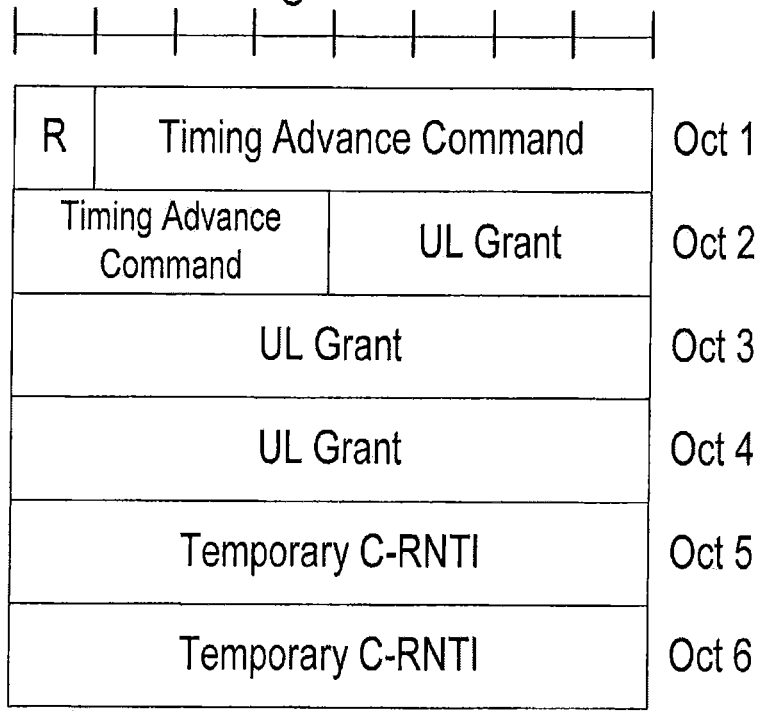
FIG. 5 is a block diagram illustrating a random access response message.

During a random access procedure in LTE (Long Term Evolution), after the wireless terminal UE has sent the initial PRACH (Physical Random Access Channel) preamble (operation 401) and received the Random Access Response (RAR) message from the base station BS (operation 402), the wireless terminal UE sends Msg3 at operation 403 which may contain a message from upper layers, such as a Radio Resource Control (RRC) connection request. The Msg3 is scheduled using an uplink (UL) grant which is included in the RAR message (e.g., a Medium Access Control RAR message) as shown in FIG. 5 (see, 3GPP TS 36.321, "Medium Access Control (MAC) protocol specification, Release 12," V12.5.0, March 2015). With a conventional wireless terminal UE (e.g., a cellular radiotelephone, a smartphone, a tablet computer, a laptop computer, etc.), Msg4 may be scheduled as a normal downlink transmission, by sending a downlink allocation over the control channel (e.g., the Physical Downlink Control Channel or PDCCH).

In examples discussed below, base station BS-a may provide wireless communications for wireless terminals UE-a, UE-b, and UE-g, wireless terminals UE-a and UE-g may be an MTC wireless terminals, and wireless terminal UE-b may be a conventional wireless terminal. Accordingly, random access procedures for wireless terminals UE-a and UE-g may be different than random access procedures for wireless terminal UE-b.

As shown in FIG. 5, an RAR for conventional wireless terminal UE-b may include a reserved bit R, a timing advance command (11 bits), an uplink (UL) grant for Message 3 of operation 403 (20 bits), and a temporary identification (e.g., C-RNTI or cell radio network temporary identifier) for wireless terminal UE-b (16 bits). The UL grant (for Message 3 of operation 403) of FIG. 5 may be specified in TS 36.213 (see, 3GPP TS 36.213, "Physical layer procedures," Release 12, V12.0.0, December 2013) and may have the following structure:
 Hopping flag—1 bit
 Fixed size resource block assignment—10 bits
 Truncated modulation and coding scheme—4 bits
 TPC command for scheduled PUSCH—3 bits
 UL delay—1 bit
 CSI (Channel State Information) request—1 bit
Thus the total size of the UL grant used in RAR may be 20 bits.

In 3GPP Rel-13 for MTC (Machine-Type Communications) wireless devices UEs, random access procedures may be specified for low complexity wireless terminals UEs and wireless terminals UEs requiring/using coverage enhancements (e.g., in situations where the UEs are in deep coverage in basements, etc.). Different methods may be used to obtain coverage enhancements, where an effect on current LTE procedures may come from time repetitions of various channels. Stated in other words, the data included in one TTI (Transmission Time Interval) may be repeated in time so the recipient(s) can accumulate energy over longer time periods to enhance the coverage of the transmissions.

For a random access procedure, coverage enhancements may mean extending the time it takes to send each of the messages (e.g., PRACH preamble, RAR, Msg3, and Msg4 and the related control channels, where applicable). The different repetition factors of messages (both data and control) and locations of the messages may need to be signaled or determined in one way or another so that MTC wireless terminal UE-a and the base station BS-a can communicate with each other and complete the random access procedure. Such repetition may not be needed, however, for non-MTC wireless terminals (e.g., for conventional wireless terminals such as cellular radiotelephones, smartphones, tablet computers, laptop computers, etc.) such as wireless terminal UE-b.

The time domain configuration and frequency domain configuration for Message 3 (of operation 403) may need to be determined by MTC wireless terminal UE-a, but this may not be included in current systems/specifications such as the RAR of FIG. 5.

A time domain configuration and frequency domain configuration for the control channel (e.g., M-PDCCH) for Msg4 may also need to be provided/determined. A current MCS (Modulation and Coding Scheme) field in the UL (uplink) grant for Msg3 of FIG. 5 may not be large enough to provide the repetition factors and/or the location properly. As used herein, a repetition factor refers to a number of different time resources used to transmit a message, and location refers to a time/frequency resource used to transmit a message. For example, the location may refer to a time and frequency resource(s) used to transmit one repetition of a message, and the repetition factor may refer to a number of subframes over which the message is transmitted/retransmitted.

According to some embodiments of inventive concepts, UL grant contents for Msg3 may be modified for MTC wireless terminals UE-a and UE-g in a way that the message size does not need to be extended and the same MAC RAR format can be reused for coverage enhanced and/or low complexity Rel-13 UEs. A portion(s) of the current message fields may be reused by indicating a repetition factor for Msg3. Also, a location (narrowband) of the Msg3 transmission may be included in the UL grant. Additionally, a location and repetition factor for the control channel (e.g., M-PDCCH) for Msg4 may be included in the UL grant.

According to some embodiments of inventive concepts, a general structure/format of the MAC (Medium Access Control) RAR (Random Access Response) may not need to be changed for MTC wireless devices, and the UL grant size may not need to be extended. Instead, the UL grant field of the RAR may be used differently for MTC wireless devices without significantly changing the general structure/format of the RAR. The base station may thus have flexibility to indicate a time domain configuration and a frequency domain configuration for Msg3 via RAR.

The time domain configuration may include a repetition factor for Message 3 (of operation 403). Here the 'repetition' refers to repeatedly transmitting code bits of a given transport block (TB). In one embodiment, the 'repetition' may be simple repetition of the same code bits. Alternatively, the 'repetition' may be transmitting several, different, sets of code bits associated with the given transport block.

The time domain configuration may further include a transmission time interval (TTI) field for Message 3 transmission on the uplink. The TTI field contains information about the number of UL subframes that a set of code bits of a TB is mapped to. In one alternative (as in legacy LTE system), a TTI is one subframe, i.e., 1 millisecond. In another alternative (as in narrowband IoT system), a TTI (i.e., an extended TTI) is composed of multiple subframes. A typical value in an extended TTI may be composed of six subframes. If only two possible TTIs are defined in the system, then the TTI field can be 1 bit, for example, TTI field=0 indicates TTI of one subframes, TTI field=1 indicates TTI of six subframes. In general, if Q possible TTIs are defined in the system, then the TTI field is composed of ceil(log 2(Q)) bits.

The frequency domain configuration may include a resource block assignment that indicates PRB resources for Message 3 uplink transmission, wherein the resource block assignment includes (a) an UL narrowband index and (b) a set of PRB pairs within the narrowband. The frequency domain configuration may further include a frequency hopping configuration of the Message 3 uplink transmission.

In one embodiment, the time domain configuration provided by RAR contains a repetition factor for Msg3 (and/or time/frequency location of Msg3), and the repetition factor for the control channel scheduling (e.g. M-PDCCH) the possible retransmissions of Msg3 during random access procedures for MTC wireless terminals. A control channel location and repetition factor may also be provided for Message 4 so that Message 4 can be scheduled. This can be understood as initializing a UE-specific search space for control channels.

Before sending Message 3 (of operation 403) during a random access procedure, an MTC wireless terminal UE has transmitted at least the PRACH preamble (operation 401) and received the RAR (operation 404) from the base station BS. The repetition factor for the PRACH preamble may depend on the UE coverage level, but the RAR repetition factor may be based on the used PRACH resources. For example, an MTC wireless terminal may determine its coverage level based on an estimation of downlink signaling from the base station, and an MTC wireless terminal may select a PRACH resource based on the determined coverage level. According to some embodiments, a first set of random access preambles may be associated with a first coverage level (e.g., for a medium quality DL channel) indicating a first repetition factor (e.g., for a relatively low number of repetitions), and a second set of random access preambles may be associated with a second coverage level (e.g., for poor quality DL channel) indicating a second repetition factor (e.g., for a relatively high number of repetitions).

According to some embodiments of inventive concepts, the following information elements may be included in the UL grant in RAR for an MTC wireless terminal:

Element 1. Time domain configuration for PUSCH carrying Msg3,

Element 2. Frequency domain configuration for PUSCH carrying Msg3,

Element 3. Time domain configuration for control channel (e.g., M-PDCCH) for Msg4, Element 4. Frequency domain configuration for control channel for Msg4.

The following sections provide examples of possible implementations of the above Elements 1-4 in the UL grant in RAR for an MTC wireless terminal.

As noted above, Element 1 may contain a repetition factor for PUSCH (Physical Uplink Shared Channel) carrying Msg3. If N bits are used, then $2^N$ distinct levels of repetition factors could be configured.

According to some embodiments with Element 1 (Option 1 for Element 1), the levels of repetition factors may be offsets with reference to a number of repetitions of another channel or signal. The offset sizes can be a function of CE (coverage enhancement) level (also referred to as a coverage level). In alternative embodiments, offset calculations may be the same for all coverage levels. Examples a, b, and c for Message 3 repetition factors are discussed below.

a. In one example, the offsets for a Message 3 repetition factor may be offsets with reference to a number of repetitions of a PRACH preamble sequence (also referred to as a random access preamble). As discussed above, an MTC wireless terminal may select a PRACH preamble sequence based on DL channel quality, one set of preamble sequences may be associated with a first number of repetitions of the sequence, and a second set of preamble sequences may be associated with a second number of repetitions of the sequence. For example, if N=2 (2 bits), $2^2$=4 repetition offsets may be provided relative to a repetition level of the PRACH Random Access Preamble. The offset sizes can be a function of CE (coverage enhancement) level. For example, for 5 dB≤CE<10 dB (for a low quality DL channel), the offsets may be {−8, −4, 4, 8} to be subtracted from or added to the random access preamble repetition factor. For 10 dB≤CE<15 dB (for a lower quality DL channel), the offsets may be {−16, −8, 8, 16} to be subtracted from or added to the random access preamble repetition factor. For 15 dB≤CE (for a lowest quality DL channel), the offsets may be {−32, −16, 16, 32} to be subtracted from or added to the random access preamble repetition factor.

b. In another example, the offsets may be offsets with reference to a number of repetitions of M-PDCCH for the RAR transmission.

c. In another example, the offsets may be offsets with reference to a number of repetitions of PDSCH (Physical Downlink Shared Channel) carrying the RAR transmission.

According to some other embodiments with Element 1 (Option 2 for Element 1), a set of PUSCH repetition levels may be defined for a given coverage enhancement level, with multiple different sets possible for multiple coverage levels. If N bits are used, then a set can contain $2^N$ distinct levels of repetition factors. Which set Element 1 points to may depend on the coverage enhancement (CE) level. As discussed above, coverage enhancement levels may be defined as: 5 dB≤CE<10 dB for a low quality DL channel; 10 dB≤CE<15 dB for a lower quality DL channel; and 15 dB≤CE (for a lowest quality DL channel). For a low quality DL channel (5 dB≤CE<10 dB) with N=2, the Message 3 may be retransmitted a number of times equal to the repetition factor (e.g., 1, 2, 3, or 4 times). For a lower quality DL channel (10 dB≤CE<15 dB) with N=2, the Message 3 may be retransmitted a number of times equal to the repetition factor plus $N^2$ (e.g., 5, 6, 7, or 8 times). For a lowest quality DL channel (15 dB≤CE) with N=2, the Message 3 may be retransmitted a number of times equal to the repetition factor plus $2N^2$ (e.g., 9, 10, 11, or 12 times). Stated in other words, with N=4, four different repetition factors are available, and the repetition factor may be used as an offset relative to a starting point based on the coverage enhancement level.

According to still other embodiments with Element 1 (Option 3 for Element 1), the repetition factor may be directly signaled as a number (e.g., base 2). The numbers can be interpreted "normally" as consecutive numbers or having an offset or integer step between the repetition values. These embodiments may require more bits to be used (e.g., to signal 128 different levels 7 bits may be required). In one alternative, the signaled numbers may be interpreted differently depending on the current coverage enhancement level (as in step 1).

Element 1 may further contain a starting subframe among the set of UL subframes that carry the PUSCH.

Element 1 may further contain a transmission time interval (TTI) field for Message 3 transmission on the uplink. If the PUSCH Message 3 is configured with TTI=Q subframes and R repetitions, then one transmission of PUSCH Message 3 takes Q*R subframes.

As noted above, Element 2 is a frequency domain configuration for PUSCH for Msg3. The used narrowband (e.g., an identification of the 6 physical resource blocks PRBs in time and frequency within a subframe to be used) may be indicated first, and the location of PUSCH within that narrowband (e.g., which subset of the 6 PRBs) may be indicated second. Examples a and b are discussed below:
  a. The narrowband index may be signaled with log 2(floor(100/6))=4 bits, when narrowband size is 6 physical resource blocks (PRB) in a system with a maximum of UL system BW bandwidth of 100 PRBs.
  b. If full resource allocation flexibility is allowed, this may need b=⌈$\log_2(N_{RB}^{UL} \cdot (N_{RB}^{UL}+1)/2)$⌉=ceil(log 2 (6*7/2))=5 bits. If unnecessary resource allocation flexibility (e.g., only allow PUSCH occupying {1,2,3,6} PRBs, i.e., remove {4,5} PRBs) is removed, however, then this part may be reduced to 4 bits. Stated in other words, full resource allocation for {1,2,3,4,5,6} PRBs may allow selection of 1 out of 6 PRBs, 2 out of 6 PRBs, 3 out of 6 PRBs, 4 out of 6 PRBs, 5 out of 6 PRBs, or 6 out of 6 PRBs. The reduced selection for {1,2,3,6} PRBs may allow selection of 1 out of 6 PRBs, 2 out of 6 PRBs, 3 out of 6 PRBs, or 6 out of 6 PRBs.

As noted above, Element 3 is a time domain configuration for a control channel (e.g. M-PDCCH) for Msg4.

According to some embodiments with Element 3 (Option 1 for Element 3), Element 3 can be 0 bits if M-PDCCH for Msg4 reuses a repetition factor of another channel (such as PRACH preamble, RAR, or M-PDCCH of RAR). This may leave M bits for some other fields. For example, M=2 bits for TPC (Transmit Power Control) command. Examples a and b are discussed below:
  a. For example, M-PDCCH for Msg4 may be defined to reuse the actual number of repetitions as M-PDCCH of RAR. In this case, blind decoding of R (a number of subframes over which Message 4 is transmitted/retransmitted) may not be necessary.
  b. In another example, the (L, R) search space configuration of M-PDCCH for Msg4 may be defined to reuse the same (L, R) search space configuration as M-PDCCH of RAR. In this case, the set of possible R values may be reused, but blind decoding may still be necessary for the UE to know which R value is actually used. Here, L represents the ECCE (Enhanced Control Channel Element) aggregation level of M-PDCCH, and R represents the number of repetitions across subframes. A set of (L, R) is associated with a search space configuration of an M-PDCCH. Stated in other words, L represents a time/frequency resource(s) within a subframe for M-PDCCH for Message 4, and R represents a number of subframes over which M-PDCCH for Message 4 is transmitted/retransmitted.

According to some other embodiments with Element 3 (option 2 for Element 3), Element 3 may take M bits so that no reuse is necessary. Similar to Element 1, multiple options exist for Element 3 as discussed below:
  a. In one example, Element 3 takes M bits, providing $2^M$ repetition offsets relative to the actual number of repetitions used for M-PDCCH of RAR. In this case, the R value is provided via Element 1 without ambiguity, and no blind decoding of R is necessary.
  b. In another example, a set of M-PDCCH repetition levels are defined for a given coverage enhancement level, with multiple different sets possible for multiple coverage levels. A typical case is 4 different sets of R values is defined for 4 different CE levels, respectively, with the CE levels corresponding to 0 dB (e.g., 0 dB≤CE<5 dB), 5 dB (e.g., 5 dB≤CE<10 dB), 10 dB (e.g., 10 dB≤CE<15 dB), and 15 dB (e.g., 15 dB≤CE) (or another similar set) of coverage enhancement. In this case, the set of possible R values may be indicated via Element 3 (2 bits) among 4 sets, but blind decoding may still be necessary for the UE to know which R value is actually used within the indicated set. The 4 sets that Element 3 index into may not be explicitly defined for M-PDCCH of Msg4. For example, the same sets defined for common search space can be reused here. The number of different R values within a given set may vary with CE level.
  c. In another example, the repetition factor is determined as in options 2 and 3 for Element 1.

As noted above, Element 4 is a frequency domain configuration for the control channel for Msg4.

According to some embodiments with Element 4, Element 4 can be just the DL (downlink) narrowband index (i.e., without Physical Resource Block PRB location information within the DL narrowband). This may be possible when assuming that the PRB set for M-PDCCH is always a fixed number of PRBs (e.g., all of the 6 PRBs in a narrowband). Similar to Element 2, Element 4 could take P=log 2 floor(100/6)=4 bits. Note that there are usually multiple M-PDCCH candidates of varying aggregation levels, so the actual M-PDCCH may not use all resource elements in the 6 PRB, and two or more M-PDCCHs may multiplex over the same set of PRB pairs.

With the examples discussed above, Elements 1-4 may take 14-16 bits, and this may leave 4-6 bits for remaining information in the UL grant (e.g., for modulation and coding scheme MCS). For coverage enhanced operation according to some embodiments, it is likely that no other information would be needed.

It should be noted that the numbers in embodiments discussed above are provided as examples. Moreover, the sizes of the fields may be modified to increase, for example, the number of possible repetition offsets, if there is room in the UL grant. The total size of the UL grant may be limited to no more than 20 bits, however, to keep it compatible with the current MAC RAR format.

As Msg4 is scheduled as a normal UE-specific downlink transmission, Elements 3 and 4 above can be understood as information initializing the UE-specific search space for M-PDCCH. This may be a significant step as otherwise the UE may not know how to find the M-PDCCH and thus the scheduling information (e.g. location, repetitions) for Msg4. UE-specific search space information provided by Elements 3 and 4 can be used for subsequent M-PDCCH transmission until more detailed M-PDCCH configuration is provided via RRC signaling.

If possible, Msg3 HARQ (Hybrid Automatic Repeat Request) retransmissions may be scheduled in the same way as normal uplink messages, the control channel time/frequency location and M-PDCCH repetition factor may need to be known. In one embodiment, this configuration may be the same as for Msg4 M-PDCCH (Elements 3 and 4).

In some embodiments, only parts of Elements 1-4 may be applied. For example, in some embodiments only Elements 3 and 4 are used to configure the UE-specific search space for M-PDCCH, and other information, such as Msg3 scheduling information, is determined through other means (e.g., through the used PRACH resource set). In another example, only Elements 1 and 2 are applied, but the M-PDCCH search space is configured through alternative means.

The above discussion refers to some embodiments where the MAC RAR message format is as shown in FIG. 5. Stated in other words, the MAC RAR message format/size may be the same as and/or similar to MAC RAR message formats in the currently deployed systems. In further embodiments, the RAR message size may be changed.

If some parts/fields of the RAR message are left out or their size is reduced, then the total message size may be reduced. The message can be padded up to the size of the legacy message, or the message may be sent as a shorter message which may provide a further benefit of consuming less radio resources when transmitted. The message size may still be byte aligned, such that the total size is divisible by 8.

According to some embodiments, if a Temporary C-RNTI (Cell Radio Network Temporary Identifier) is not used at all, the RAR message may be 2 octets shorter. Either this message is sent as a shorter message, padded up to full size, or more bits are used for other parts of the message (e.g., using more bits for the UL grant part). According to some other embodiments, if some Elements provided above are left out, the UL grant and the total message size can be reduced.

In alternative embodiments, all or some of the Elements provided above may be included in the UL grant in the MAC RAR message format, but the MAC RAR message size may be larger (more than 6 octets for the message without MAC header(s)). In yet other embodiments, part(s) of the Elements may be included in the MAC RAR message, but not necessarily in the UL grant part of the message.

According to some embodiments disclosed herein, existing MAC RAR and UL grant formats may be used to determine/provide the scheduling information for Msg3 and Msg4 for bandwidth reduced low complexity and coverage enhanced UEs (ref. LTE Rel-13 MTC and coverage enhancements). The contents of the UL grant may be redefined to include information discussed above with a goal of keeping the MAC RAR size the same.

Operations of a wireless terminal UE will now be discussed with reference to the flow chart of FIG. 6 and the modules of FIG. 7. For example, modules of FIG. 7 may be stored in wireless terminal memory 307 of FIG. 3, and these modules may provide instructions so that when the instructions of a module are executed by wireless terminal processor 303, processor 303 performs respective operations of the flow chart of FIG. 6.

As shown in FIG. 1, wireless terminal UE may communicate over a wireless interface with a base station BS of a Radio Access Network RAN. At block 601 of FIG. 6, processor 303 may transmit a random access preamble of a random access procedure through transceiver 301 to node BS-a of radio access network RAN (e.g., using instructions of random access preamble transmission module 701). After transmitting the random access preamble, processor may receive a random access response RAR of the random access procedure from node BS-a of the radio access network through transceiver 301 at block 603 (e.g., using instructions of RAR reception module 703). The random access response may include an Uplink UL grant for a Message 3 uplink communication of the random access procedure and a time domain configuration associated with the Message 3 uplink communication. Moreover, the time domain configuration may include (a) a repetition factor that defines a number of repetitions across subframes for the Message 3 uplink communication, and/or (b) Transmission Time Interval TTI information for the Message 3 uplink communication.

The UL grant may further include a frequency domain configuration associated with the Message 3 uplink communication. The frequency domain configuration may include a resource block assignment that indicates Physical Resource Block PRB resources for the Message 3 uplink communication, with the resource block assignment including (a) an UL narrowband index and (b) a set of PRB pairs within the narrowband, and/or a frequency hopping configuration of the Message 3 uplink communication.

At block 605, processor 303 may provide transmission of the Message 3 uplink communication through transceiver 301 to base station BS-a of the radio access network (e.g., using instructions of message 3 uplink communication transmission module 705).

According to some embodiments, the random access response of block 603 may include the repetition factor for the Message 3 uplink communication of the random access procedure. According to such embodiments, processor 303 may provide a number of repeated transmissions of the Message 3 uplink communication through transceiver 301 to the node BS-a of the radio access network at block 605, with the number of repeated transmissions being based on the repetition factor for the Message 3 uplink communication. The number of repeated transmissions may be based on the repetition factor for the Message 3 uplink communication and a number of repeated transmissions of the random access preamble, and/or the number of repeated transmissions may be based on the repetition factor for the Message 3 uplink communication and a coverage enhancement level of a downlink channel from the node BS-a to the wireless terminal UE-a. The number of repeated transmissions may be based on the repetition factor for the Message 3 uplink communication and a number of repeated transmissions of the random access response and/or based on the repetition factor for the Message 3 uplink communication and a number of repeated transmissions of control information for the random access response.

According to some embodiments, the random access response of block 603 may include information defining a time and/or frequency location associated with the Message 3 uplink communication. According to such embodiments, processor 303 may provide transmission of the Message 3 uplink communication at block 605 based on the information defining the time and/or frequency location from the random access response. Information defining the time and/or frequency location may define a time and/or frequency location in a subframe for the Message 3 uplink communication. The information defining the time and/or frequency location may define one or more of: a starting subframe among a set of subframes that carries the Message 3 uplink transmission; a number of repetitions across subframes for carrying the Message 3 uplink transmission; a frequency location in a subframe for the Message 3 uplink transmission, where the frequency location is provided by a narrowband index or a PRB pair index; a number of PRB pairs occupied by the Message 3 uplink transmission; a resource block allocation information of the Message 3 uplink transmission; and/or a frequency hopping configuration of the Message 3 uplink transmission.

In addition, the random access response of block 603 may include configuration information of a control channel for a Message 4 downlink communication. At block 607, processor 303 may receive the control channel associated with the Message 4 downlink communication based on the configuration information through transceiver 301 (e.g., using control channel reception module 707). At block 609, processor 303 may receive the Message 4 downlink communication through transceiver 301 from the node BS-a based on the control channel (e.g., using Msg4 downlink communication reception module 709). The configuration information includes a time and/or frequency resource definition that provides one or more of: a starting subframe among a set of subframes that carries the control channel associated with the Message 4 downlink communication; a number of repetitions across subframes for carrying the control channel; a frequency location in a subframe for the control channel, where the frequency location is provided by a narrowband index or a PRB pair index; a number of PRB pairs that are used for the control channel; a resource block assignment information of the control channel; and/or a frequency hopping configuration of the control channel.

The random access response of block 603 may further include a timing advance command and a temporary identification for the wireless terminal, and the UL grant may be included between the timing advance command and the temporary identification for the wireless terminal. The random access response may include six octets, the timing advance command may be included in a portion of a first of the six octets and a portion of a second of the six octets, the UL grant may be included in a portion of the second of the six octets and in third and fourth octets of the six octets, and the temporary identification for the wireless terminal may be included in fifth and sixth octets of the six octets.

Transmitting the random access preamble at block 601 may include transmitting the random access preamble via a physical random access channel PRACH, and/or receiving the random access response at block 603 may include receiving the random access response via a physical downlink shared channel PDSCH.

Figure 6:
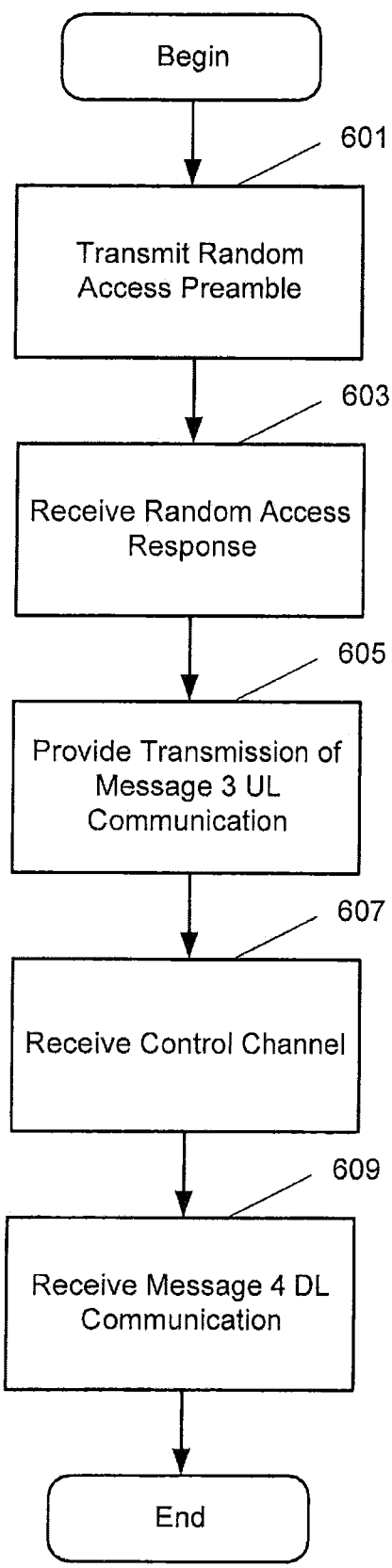
FIG. 6 is a flow chart illustrating operations of a wireless terminal according to some embodiments of inventive concepts.
Figure 7:
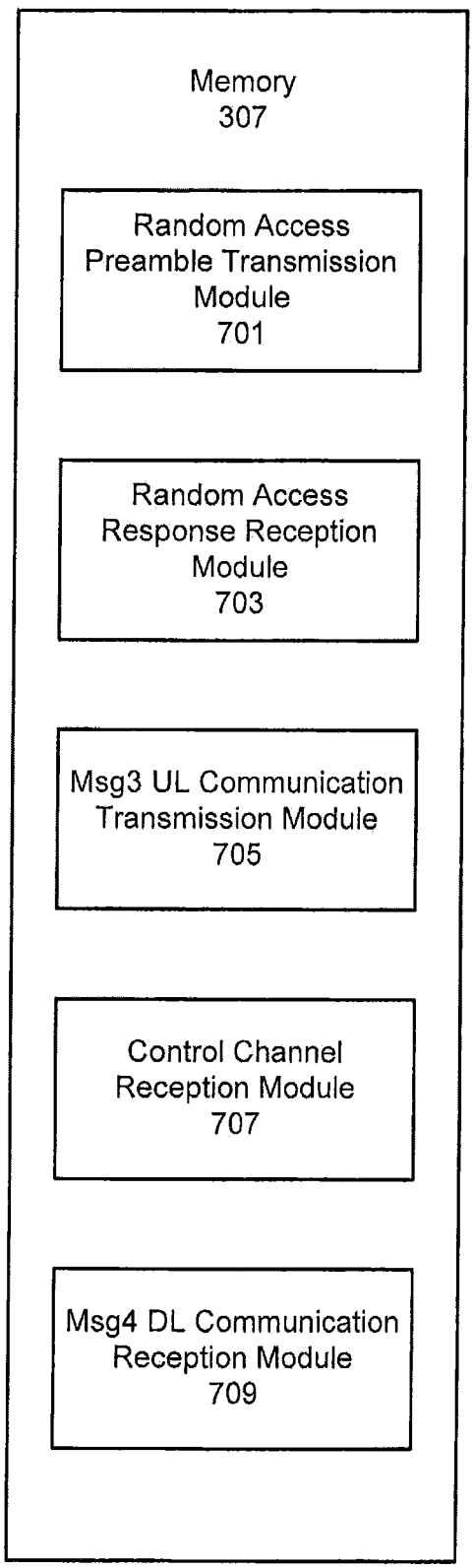
FIG. 7 is a block diagram illustrating memory modules corresponding to operations of FIG. 6 according to some embodiments of inventive concepts.

Various operations of FIG. 6 and/or modules of FIG. 7 may be optional with respect to some embodiments of wireless terminals and related methods. Regarding methods of example embodiment 1 (set forth below), for example, operations of blocks 605, 607, and 609 of FIG. 6 may be optional, and regarding related wireless terminals, modules 705, 707, and 709 of FIG. 7 may be optional.

Operations of a base station BS will now be discussed with reference to the flow chart of FIG. 8 and the modules of FIG. 9. For example, modules of FIG. 9 may be stored in base station memory 207 of FIG. 2, and these modules may provide instructions so that when the instructions of a module are executed by wireless terminal processor 203, processor 203 performs respective operations of the flow chart of FIG. 8.

As shown in FIG. 1, base station BS of a Radio Access Network RAN may communicate over a wireless interface with a plurality of wireless terminals. At block 801 of FIG. 8, processor 203 may receive a random access preamble of a random access procedure from the wireless terminal UE-a through transceiver 201 (e.g., using instructions of random access preamble reception module 901). Responsive to receiving the random access preamble, processor 203 may transmit a random access response RAR of the random access procedure through transceiver 201 to the wireless terminal UE-a at block 803 (e.g., using instructions of random access response transmission module 903). The random access response may include an uplink UL grant for a Message 3 uplink communication of the random access procedure, and the UL grant may include a time domain configuration associated with the Message 3 uplink communication. More particularly, the time domain configuration may include: (a) a repetition factor that defines a number of repetitions across subframes for the Message 3 UL communication; and/or (b) Transmission Time Interval TTI information for the Message 3 UL communication.

The UL grant may further include a frequency domain configuration associated with the Message 3 uplink communication. The frequency domain configuration may include: a resource block assignment that indicates Physical Resource Block PRB resources for the Message 3 uplink communication, wherein the resource block assignment includes (a) an UL narrowband index and (b) a set of PRB pairs within the narrowband; and/or a frequency hopping configuration of the Message 3 uplink communication.

At block 805, processor 203 may receive the Message 3 uplink communication through transceiver 201 from wireless terminal UE-a (e.g., using instructions of Msg3 uplink communication reception module 905).

According to some embodiments, the random access response of block 803 may include the repetition factor for the Message 3 uplink communication of the random access procedure. At block 805, processor 203 may receive a number of repeated transmissions of the Message 3 uplink communication from the wireless terminal UE-a through transceiver 201, with the number of repeated transmissions being based on the repetition factor for the Message 3 uplink communication. The number of repeated transmissions may be based on the repetition factor for the Message 3 uplink communication and a number of repeated transmissions of the random access preamble, and/or the number of repeated transmissions may be based on the repetition factor for the Message 3 uplink communication and a coverage enhancement level of a downlink channel from the node BS-a to the wireless terminal UE-a.

According to some embodiments, the random access response of block 803 may include information defining a time and/or frequency location associated with a Message 3 uplink communication. At block 805, processor 203 may receive a Message 3 uplink communication based on the information defining the time and/or frequency location from the random access response. Information defining the time and/or frequency location may define a time and/or frequency location in a subframe for the Message 3 uplink communication. The information defining the time and/or frequency location may define one or more of: a starting subframe among a set of subframes that carries the Message 3 uplink transmission; a number of repetitions across subframes for carrying the Message 3 uplink transmission; a frequency location in a subframe for the Message 3 uplink transmission, where the frequency location is provided by a narrowband index or a PRB pair index; a number of PRB pairs occupied by the Message 3 uplink transmission; a resource block allocation information of the Message 3 uplink transmission; and/or a frequency hopping configuration of the Message 3 uplink transmission.

The random access response of block 803 may include configuration information of a control channel for a Message 4 downlink communication. At block 807, processor 203 may transmit the control channel associated with the Message 4 downlink communication through transceiver 201 to the wireless terminal based on the configuration information (e.g., using instructions of control channel transmission module 907). At block 809, processor 203 may transmit the Message 4 downlink communication through transceiver 201 to the wireless terminal UE-a based on the control channel (e.g., using instructions of message 4 downlink communication transmission module 909).

The configuration information may include a time and/or frequency resource definition that provides one or more of: a starting subframe among a set of subframes that carries the control channel associated with the Message 4 downlink communication; a number of repetitions across subframes for carrying the control channel; a frequency location in a subframe for the control channel, where the frequency location is provided by a narrowband index or a PRB pair index; a number of PRB pairs that are used for the control channel; a resource block assignment information of the control channel; and/or a frequency hopping configuration of the control channel.

The random access response of block 803 may further include a timing advance command and a temporary identification for the wireless terminal, and the UL grant may be included between the timing advance command and the temporary identification for the wireless terminal. The random access response may include six octets, the timing advance command may be included in a portion of a first of the six octets and a portion of a second of the six octets, the UL grant may be included in a portion of the second of the six octets and in third and fourth octets of the six octets, and the temporary identification for the wireless terminal may be included in fifth and sixth octets of the six octets.

The random access response of block 803 may further include a timing advance command, a temporary identification for the wireless terminal, and/or a modulation and coding scheme for the Message 3 uplink communication.

Receiving the random access preamble at block 801 may include receiving the random access preamble via a physical random access channel PRACH, and/or transmitting the random access response at block 803 may include transmitting the random access response via a physical downlink shared channel PDSCH.

Figure 8:
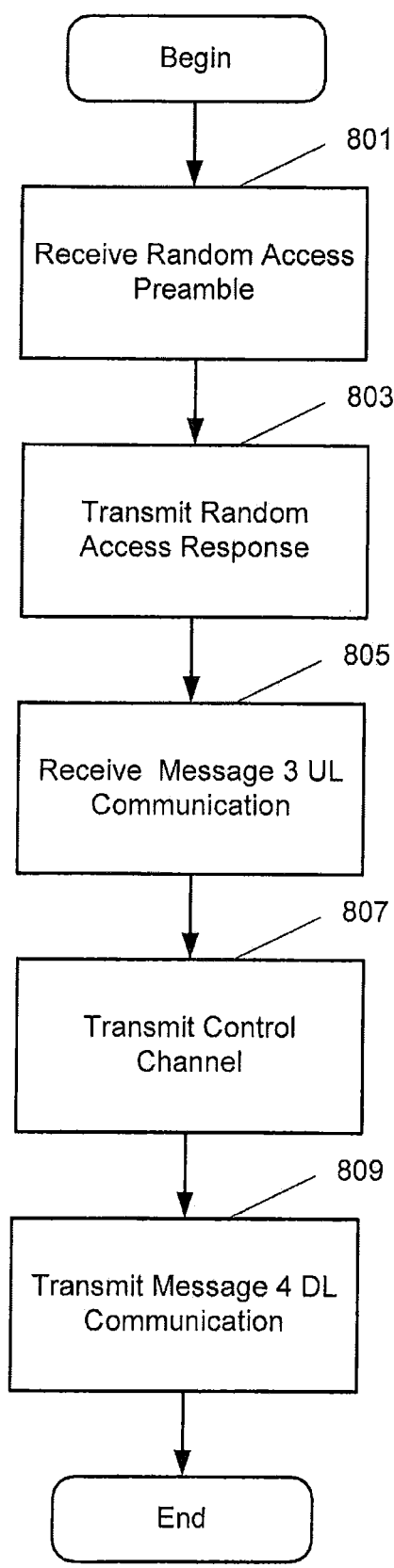
FIG. 8 is a flow chart illustrating operations of a network node according to some embodiments of inventive concepts.
Figure 9:
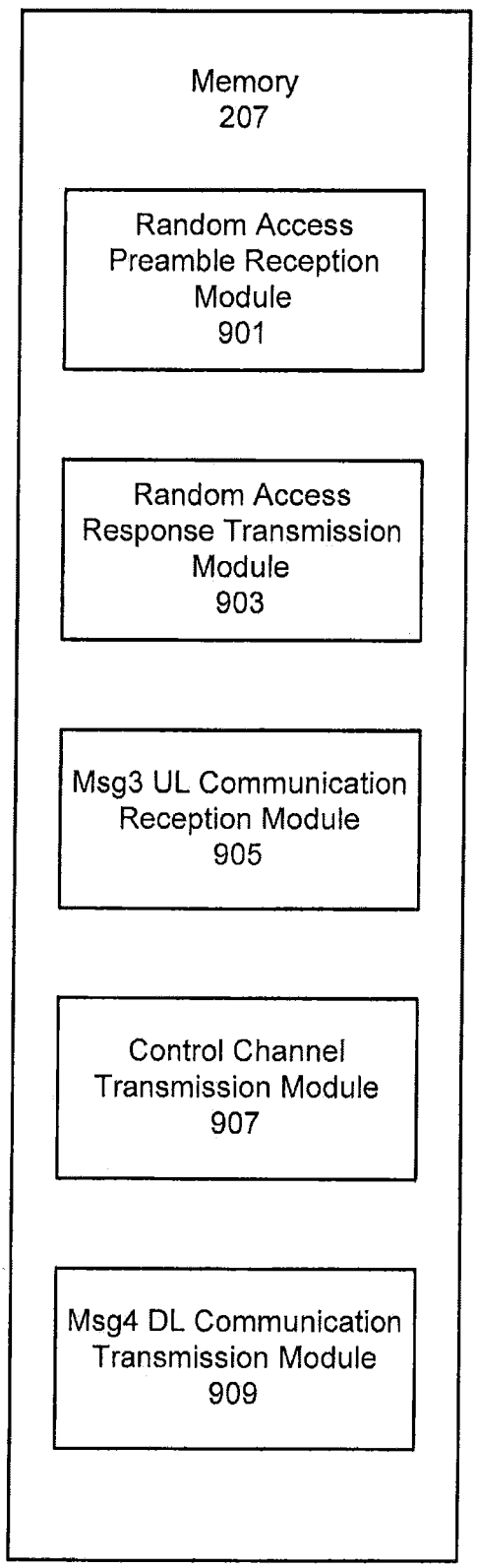
FIG. 9 is a block diagram illustrating memory modules corresponding to operations of FIG. 8 according to some embodiments of inventive concepts.

Various operations of FIG. 8 and/or modules of FIG. 9 may be optional with respect to some embodiments of base stations and related methods. Regarding methods of example embodiment 30 (set forth below), for example, operations of blocks 805, 807, and 809 of FIG. 8 may be optional, and regarding related termination nodes, modules 905, 907, and 909 of FIG. 9 may be optional.

REFERENCES

[1] 3GPP TS 36.321, "Medium Access Control (MAC) protocol specification (Release 12)," V12.5.0, March 2015.

[2] 3GPP TS 36.331, "Radio Resource Control (RRC); Protocol Specification (Release 12)," V12.5.0, March 2015.

[3] 3GPP TS 36.213, "Physical layer procedures (Release 12)," V12.0.0, December 2013.

[4] 3GPP TS 36.211, "Physical channels and modulation (Release 12)," V12.0.0, December 2013.

[5] 3GPP TSG-RAN WG2 #91, "Random Access For Rel-13 Low Complexity And Enhanced Coverage UEs," Beijing, P.R. China, 24-28 Aug. 2015.

Example Embodiments:

1. A method of operating a wireless terminal (UE-a), the method comprising:

transmitting a random access preamble of a random access procedure from the wireless terminal (UE-a) to a node (BS-a) of a radio access network, RAN; and after transmitting the random access preamble, receiving a random access response, RAR, of the random access procedure from the node (BS-a) of the radio access network, wherein the random access response includes an Uplink, UL, grant for a Message 3 uplink communication of the random access procedure, wherein the UL grant includes a time domain configuration associated with the Message 3 uplink communication, wherein the time domain configuration includes (a) a repetition factor that defines a number of repetitions across subframes for the Message 3 uplink communication, and/or (b) Transmission Time Interval, TTI, information for the Message 3 uplink communication.

2. The method of Embodiment 1, wherein the UL grant further includes a frequency domain configuration associated with the Message 3 uplink communication, wherein the frequency domain configuration includes, a resource block assignment that indicates Physical Resource Block, PRB, resources for the Message 3 uplink communication, wherein the resource block assignment includes (a) an UL narrowband index and (b) a set of PRB pairs within the narrowband, and/or a frequency hopping configuration of the Message 3 uplink communication.

3. The method of any of Embodiments 1-2, wherein the random access response further includes a repetition factor associated with a Message 4 downlink communication of the random access procedure wherein the repetition factor is used to define a number of repetitions associated with the Message 4 downlink communication.

4. The method of any of Embodiments 1-3 wherein the random access response includes the repetition factor for the Message 3 uplink communication of the random access procedure, the method further comprising: providing a number of repeated transmissions of the Message 3 uplink communication from the wireless terminal (UE-a) to the node (BS-a) of the radio access network wherein the number of repeated transmissions is based on the repetition factor for the Message 3 uplink communication.

5. The method of Embodiment 4 wherein the number of repeated transmissions is based on the repetition factor for the Message 3 uplink communication and a number of repeated transmissions of the random access preamble.

6. The method of Embodiment 4 wherein the number of repeated transmissions is based on the repetition factor for the Message 3 uplink communication and a coverage enhancement level of a downlink channel from the node (BS-a) to the wireless terminal (UE-a).

7. The method of Embodiment 6 further comprising: determining the coverage enhancement level of the downlink channel based on downlink transmissions received from the node (BS-a).

8. The method of Embodiment 4 wherein the number of repeated transmissions is based on the repetition factor for the Message 3 uplink communication and a number of repeated transmissions of the random access response and/or based on the repetition factor for the Message 3 uplink communication and a number of repeated transmissions of control information for the random access response.

9. The method of any of Embodiments 4-8 wherein the Message 3 uplink transmission includes a Radio Resource Control (RRC) connection request.

10. The method of any of Embodiments 4-9 wherein the Message 3 uplink transmission is transmitted over a physical uplink shared channel (PUSCH).

11. The method of any of Embodiments 1-8 wherein the random access response includes a repetition factor associated with a Message 4 downlink communication which is used to define a number of repetitions of control information associated with the Message 4 downlink communication, the method further comprising: receiving control information associated with a Message 4 downlink communication based on the repetition factor associated with the Message 4 downlink communication; and receiving the Message 4 downlink communication from the node (BS-a) using the control information.

12. The method of Embodiment 11 wherein the number of repeated transmissions is based on the repetition factor associated with the Message 4 downlink communication and a number of repeated transmissions of the random access preamble.

13. The method of Embodiment 11 wherein the number of repeated transmissions is based on the repetition factor associated with the Message 4 downlink communication and a coverage enhancement level of a downlink channel from the node (BS-a) to the wireless terminal (UE-a).

14. The method of Embodiment 13 further comprising: determining the coverage enhancement level of the downlink channel based on downlink transmissions received from the node (BS-a).

15. The method of Embodiment 11 wherein the number of repeated transmissions is based on the repetition factor associated with the Message 4 downlink communication and a number of repeated transmissions of the random access response and/or based on the repetition factor for the Message 4 downlink communication and a number of repeated transmissions of control information for the random access response.

16. The method of any of Embodiments 11-15 wherein the control information associated with the Message 4 downlink communication is received over a physical downlink control channel, and wherein the Message 4 downlink communication is received over a physical downlink shared channel.

17. The method of any of Embodiments 11-16 wherein the Message 4 downlink communication includes a contention resolution message and/or an uplink grant for a subsequent uplink communication.

18. The method of any of Embodiments 1-17 wherein the random access response includes information defining a time and/or frequency location associated with the Message 3 uplink communication, the method further comprising: providing transmission of the Message 3 uplink communication based on the information defining the time and/or frequency location from the random access response.

19. The method of Embodiment 18 wherein information defining the time and/or frequency location defines a time and/or frequency location in a subframe for the Message 3 uplink communication.

20. The method of Embodiment 19 wherein the information defining the time and/or frequency location defines one or more of the following: (a) a starting subframe among a set of subframes that carries the Message 3 uplink transmission; (b) a number of repetitions across subframes for carrying the Message 3 uplink transmission; (c) a frequency location in a subframe for the Message 3 uplink transmission, where the frequency location is provided by a narrowband index or a PRB pair index; (d) a number of PRB pairs occupied by the Message 3 uplink transmission; (e) a resource block allocation information of the Message 3 uplink transmission; (f) a frequency hopping configuration of the Message 3 uplink transmission.

21. The method of any of Embodiments 1-20 wherein the random access response includes a configuration information of a control channel for a Message 4 downlink communication, the method further comprising: receiving the control channel associated with the Message 4 downlink communication based on the configuration information; and receiving the Message 4 downlink communication from the node (BS-a) based on the control channel.

22. The method of Embodiment 21 wherein the configuration information includes a time and/or frequency resource definition that provides one or more of the following: (a) a starting subframe among a set of subframes that carries the control channel associated with the Message 4 downlink communication; (b) a number of repetitions across subframes for carrying the control channel; (c) a frequency location in a subframe for the control channel, where the frequency location is provided by a narrowband index or a PRB pair index; (d) a number of PRB pairs that are used for the control channel; (e) a resource block assignment information of the control channel; and/or (f) a frequency hopping configuration of the control channel.

23. The method of Embodiment 22 wherein the configuration information further includes PUCCH resource offset information.

24. The method of any of Embodiments 1-22 wherein the random access response further includes a timing advance command and a temporary identification for the wireless terminal, and wherein the UL grant is included between the timing advance command and the temporary identification for the wireless terminal.

25. The method of Embodiment 24 wherein the random access response includes six octets, wherein the timing advance command is included in a portion of a first of the six octets and a portion of a second of the six octets, wherein the UL grant is included in a portion of the second of the six octets and in third and fourth octets of the six octets, and wherein the temporary identification for the wireless terminal is included in fifth and sixth octets of the six octets.

26. The method of any of Embodiments 1-25 wherein the random access response further includes a timing advance command, a temporary identification for the wireless terminal, and/or a modulation and coding scheme for the Message 3 uplink communication.

27. The method of any of Embodiments 1-26 wherein transmitting the random access preamble comprises transmitting the random access preamble via a physical random access channel (PRACH), and/or wherein receiving the random access response comprises receiving the random access response via a physical downlink shared channel (PDSCH).

28. A wireless terminal (UE-a), wherein the wireless terminal is adapted to perform according to any of Embodiments 1-27.

29. A wireless terminal (UE-a) comprising: a transceiver (301-*a*) configured to provide wireless communication with a node (BS-a) of a radio access network, RAN; and a processor (303-*a*) coupled with the transceiver, wherein the processor is configured to perform operations according to of any of Embodiments 1-27, and wherein the processor is configured to transmit and/or receive communications to/from the node (BS-a) through the transceiver (301-*a*).

30. A method of operating a node (BS-a) of a radio access network, RAN, the method comprising: receiving a random access preamble of a random access procedure from the wireless terminal (UE-a); and responsive to receiving the random access preamble, transmitting a random access response, RAR, of the random access procedure to the wireless terminal UE-a, wherein the random access response includes an uplink, UL, grant for a Message 3 uplink communication of the random access procedure, wherein the UL grant includes a time domain configuration associated with the Message 3 uplink communication, wherein the time domain configuration includes (a) a repetition factor that defines a number of repetitions across subframes for the Message 3 UL communication, or (b) Transmission Time Interval, TTI, information for the Message 3 UL communication.

31. The method of Embodiment 30, wherein the UL grant further includes a frequency domain configuration associated with the Message 3 uplink communication, wherein the frequency domain configuration includes: a resource block assignment that indicates Physical Resource Block, PRB, resources for the Message 3 uplink communication, wherein the resource block assignment includes (a) an UL narrowband index and (b) a set of PRB pairs within the narrowband; and/or a frequency hopping configuration of the Message 3 uplink communication.

32. The method of any of Embodiments 30-31, wherein random access response further includes a repetition factor associated with a Message 4 downlink communication of the random access procedure wherein the repetition factor is used to define a number of repetitions associated with the Message 4 downlink communication.

33. The method of any of Embodiments 30-32 wherein the random access response includes the repetition factor for the Message 3 uplink communication of the random access procedure, the method further comprising: receiving a number of repeated transmissions of the Message 3 uplink communication from the wireless terminal (UE-a) wherein the number of repeated transmissions is based on the repetition factor for the Message 3 uplink communication.

34. The method of Embodiment 33 wherein the number of repeated transmissions is based on the repetition factor for the Message 3 uplink communication and a number of repeated transmissions of the random access preamble.

35. The method of Embodiment 33 wherein the number of repeated transmissions is based on the repetition factor for the Message 3 uplink communication and a coverage enhancement level of a downlink channel from the node (BS-a) to the wireless terminal (UE-a).

36. The method of Embodiment 33 wherein the number of repeated transmissions is based on the repetition factor for the Message 3 uplink communication and a number of repeated transmissions of the random access response and/or based on the repetition factor for the Message 3 uplink communication and a number of repeated transmissions of control information for the random access response.

37. The method of any of Embodiments 33-36 wherein the Message 3 uplink transmission includes a Radio Resource Control (RRC) connection request.

38. The method of any of Embodiments 33-37 wherein the Message 3 uplink transmission is transmitted over a physical uplink shared channel (PUSCH).

39. The method of any of Embodiments 33-38 wherein the random access response includes a repetition factor associated with a Message 4 downlink communication which is used to define a number of repetitions of control information associated with the Message 4 downlink communication, the method further comprising: transmitting control information associated with a Message 4 downlink communication to the wireless terminal (UE-a) based on the repetition factor associated with the Message 4 downlink communication; and transmitting the Message 4 downlink communication from the node (BS-a) to the wireless terminal (UE-a) using the control information.

40. The method of Embodiment 39 wherein the number of repeated transmissions is based on the repetition factor associated with the Message 4 downlink communication and a number of repeated transmissions of the random access preamble.

41. The method of Embodiment 39 wherein the number of repeated transmissions is based on the repetition factor associated with the Message 4 downlink communication and a coverage enhancement level of a downlink channel from the node (BS-a) to the wireless terminal (UE-a).

42. The method of Embodiment 39 wherein the number of repeated transmissions is based on the repetition factor associated with the Message 4 downlink communication and a number of repeated transmissions of the random access response and/or based on the repetition factor for the Message 4 downlink communication and a number of repeated transmissions of control information for the random access response.

43. The method of any of Embodiments 39-42 wherein the control information associated with the Message 4 downlink communication is transmitted over a physical downlink control channel, and wherein the Message 4 downlink communication is transmitted over a physical downlink shared channel.

44. The method of any of Embodiments 39-43 wherein the Message 4 downlink communication includes a contention resolution message and/or an uplink grant for a subsequent uplink communication.

45. The method of any of Embodiments 30-44 wherein the random access response includes information defining a time and/or frequency location associated with a Message 3 uplink communication, the method further comprising: receiving a Message 3 uplink communication based on the information defining the time and/or frequency location from the random access response.

46. The method of Embodiment 45 wherein information defining the time and/or frequency location defines a time and/or frequency location in a subframe for the Message 3 uplink communication.

47. The method of any of Embodiments 46 wherein the information defining the time and/or frequency location defines one or more of the following: (a) a starting subframe among a set of subframes that carries the Message 3 uplink transmission; (b) a number of repetitions across subframes for carrying the Message 3 uplink transmission; (c) a frequency location in a subframe for the Message 3 uplink transmission, where the frequency location is provided by a narrowband index or a PRB pair index; (d) a number of PRB pairs occupied by the Message 3 uplink transmission; (e) a resource block allocation information of the Message 3 uplink transmission; and/or (f) a frequency hopping configuration of the Message 3 uplink transmission.

48. The method of any of Embodiments 30-47 wherein the random access response includes configuration information of a control channel for a Message 4 downlink communication, the method further comprising: transmitting the control channel associated with the Message 4 downlink communication to the wireless terminal based on the configuration information; and transmitting the Message 4 downlink communication to the wireless terminal (UE-a) based on the control channel.

49. The method of Embodiment 48 wherein the configuration information includes a time and/or frequency resource definition that provides one or more of the following: (a) a starting subframe among a set of subframes that carries the control channel associated with the Message 4 downlink communication; (b) a number of repetitions across subframes for carrying the control channel; (c) a frequency location in a subframe for the control channel, where the frequency location is provided by a narrowband index or a PRB pair index; (d) a number of PRB pairs that are used for the control channel; (e) a resource block assignment information of the control channel; and/or (f) a frequency hopping configuration of the control channel.

50. The method of any of Embodiments 49 wherein the configuration information further includes PUCCH resource offset information.

51. The method of any of Embodiments 30-50 wherein the random access response further includes a timing advance command and a temporary identification for the wireless terminal, and wherein the UL grant is included between the timing advance command and the temporary identification for the wireless terminal.

52. The method of Embodiment 51 wherein the random access response includes six octets, wherein the timing advance command is included in a portion of a first of the six octets and a portion of a second of the six octets, wherein the UL grant is included in a portion of the second of the six octets and in third and fourth octets of the six octets, and wherein the temporary identification for the wireless terminal is included in fifth and sixth octets of the six octets.

53. The method of any of Embodiments 30-52 wherein the random access response further includes a timing advance command, a temporary identification for the wireless terminal, and/or a modulation and coding scheme for the Message 3 uplink communication.

54. The method of any of Embodiments 30-53 wherein receiving the random access preamble comprises receiving the random access preamble via a physical random access channel (PRACH), and/or wherein transmitting the random access response comprises transmitting the random access response via a physical downlink shared channel (PDSCH).

55. A node (BS-a) of a radio access network, RAN, wherein the node (BS-a) is adapted to perform according to any of Embodiments 30-54.

56. A node (BS-a) of a wireless communication network, the node (BS-a) comprising: a transceiver (201-a) configured to provide wireless communication with a plurality of wireless terminals (UEs) in a coverage area of the node (BS-a); and a processor (203-a) coupled to the transceiver (201-a), wherein the processor is configured to perform operations according to any of Embodiments 30-54, and wherein the processor is configured to transmit and/or receive communications to/from wireless terminal (UE-a) through the transceiver (201-a).

Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

The invention claimed is:

1. A method of operating a wireless terminal, the method comprising:
   transmitting a random access preamble of a random access procedure from the wireless terminal to a node of a radio access network (RAN); and
   after transmitting the random access preamble, receiving a random access response (RAR) of the random access procedure from the node of the radio access network, wherein the random access response includes an Uplink (UL) grant for a Message 3 uplink communication of the random access procedure, wherein the UL grant includes:
   a time domain configuration associated with the Message 3 uplink communication, wherein the time domain configuration includes at least one of (a) a repetition factor that defines a number of repetitions across subframes for the Message 3 uplink communication, and (b) Transmission Time Interval (TTI) information for the Message 3 uplink communication; and
   a frequency domain configuration associated with the Message 3 uplink communication, wherein the frequency domain configuration includes:
   a resource block assignment that indicates Physical Resource Block (PRB) resources for the Message 3 uplink communication, wherein the resource block assignment includes (a) an UL narrowband index and (b) a set of PRB pairs within the narrowband.

2. The method of claim 1, wherein the resource block assignment includes (a) the UL narrowband index and (b) the set of PRB pairs within the narrowband, and a frequency hopping configuration of the Message 3 uplink communication.

3. The method of claim 1 wherein the random access response includes the repetition factor for the Message 3 uplink communication of the random access procedure, the method further comprising:
   providing a number of repeated transmissions of the Message 3 uplink communication from the wireless terminal to the node of the radio access network wherein the number of repeated transmissions is based on the repetition factor for the Message 3 uplink communication.

4. The method of claim 3 wherein the number of repeated transmissions is based on the repetition factor for the Message 3 uplink communication and a number of repeated transmissions of the random access preamble, or wherein the number of repeated transmissions is based on the repetition factor for the Message 3 uplink communication and a coverage enhancement level of a downlink channel from the node to the wireless terminal.

5. The method of claim 3 wherein the number of repeated transmissions is based on at least one of the repetition factor for the Message 3 uplink communication and a number of repeated transmissions of the random access response and on the repetition factor for the Message 3 uplink communication and a number of repeated transmissions of control information for the random access response.

6. The method of claim 1 wherein the random access response includes information defining at least one of a time and a frequency location associated with the Message 3 uplink communication, the method further comprising:
   providing transmission of the Message 3 uplink communication based on the information defining at least one of the time and the frequency location from the random access response.

7. The method of claim 6 wherein information defining at least one of the time and the frequency location defines at least one of a time and a frequency location in a subframe for the Message 3 uplink communication.

8. The method of claim 7 wherein the information defining at least one of the time and the frequency location comprises
   a frequency hopping configuration of the Message 3 uplink transmission.

9. The method of claim 1 wherein the random access response includes configuration information of a control channel for a Message 4 downlink communication, the method further comprising:
   receiving the control channel associated with the Message 4 downlink communication based on the configuration information; and
   receiving the Message 4 downlink communication from the node based on the control channel.

10. The method of claim 9 wherein the configuration information includes at least one of a time and a frequency resource definition that provides at least one of the following:
   (a) a starting subframe among a set of subframes that carries the control channel associated with the Message 4 downlink communication;
   (b) a number of repetitions across subframes for carrying the control channel;
   (c) a frequency location in a subframe for the control channel, where the frequency location is provided by a narrowband index or a PRB pair index;
   (d) a number of PRB pairs that are used for the control channel;
   (e) a resource block assignment information of the control channel; and
   (f) a frequency hopping configuration of the control channel.

11. The method of claim 1 wherein the random access response further includes a timing advance command and a temporary identification for the wireless terminal, and wherein the UL grant is included between the timing advance command and the temporary identification for the wireless terminal.

12. The method of claim 11 wherein the random access response includes six octets, wherein the timing advance command is included in a portion of a first of the six octets and a portion of a second of the six octets, wherein the UL grant is included in a portion of the second of the six octets and in third and fourth octets of the six octets, and wherein the temporary identification for the wireless terminal is included in fifth and sixth octets of the six octets.

13. The method of claim 1 wherein transmitting the random access preamble comprises transmitting the random access preamble via a physical random access channel (PRACH), and wherein receiving the random access response comprises receiving the random access response via a physical downlink shared channel (PDSCH).

14. A method of operating a node of a radio access network (RAN) the method comprising:
   receiving a random access preamble of a random access procedure from a wireless terminal; and
   responsive to receiving the random access preamble, transmitting a random access response (RAR) of the random access procedure to the wireless terminal, wherein the random access response includes an uplink (UL) grant for a Message 3 uplink communication of the random access procedure, wherein the UL grant includes:
      a time domain configuration associated with the Message 3 uplink communication, wherein the time domain configuration includes at least one of (a) a repetition factor that defines a number of repetitions across subframes for the Message 3 UL communication and (b) Transmission Time Interval (TTI) information for the Message 3 UL communication; and
      a frequency domain configuration associated with the Message 3 uplink communication, wherein the frequency domain configuration includes:
         a resource block assignment that indicates Physical Resource Block (PRB) resources for the Message 3 uplink communication, wherein the resource block assignment includes (a) an UL narrowband index and (b) a set of PRB pairs within the narrowband.

15. The method of claim 14 wherein the random access response includes the repetition factor for the Message 3 uplink communication of the random access procedure, the method further comprising:
   receiving a number of repeated transmissions of the Message 3 uplink communication from the wireless terminal wherein the number of repeated transmissions is based on the repetition factor for the Message 3 uplink communication.

16. The method of claim 15 wherein the number of repeated transmissions is based on the repetition factor for the Message 3 uplink communication and a number of repeated transmissions of the random access preamble, or wherein the number of repeated transmissions is based on the repetition factor for the Message 3 uplink communication and a coverage enhancement level of a downlink channel from the node to the wireless terminal.

17. The method of claim 14 wherein the random access response includes information defining at least one of a time and a frequency location associated with a Message 3 uplink communication, the method further comprising:
   receiving a Message 3 uplink communication based on the information defining at least one of the time and the frequency location from the random access response.

18. The method of claim 17 wherein information defining at least one of the time and the frequency location defines at least one of a time and a frequency location in a subframe for the Message 3 uplink communication.

19. The method of claim 18 wherein the information defining at least one of the time and the frequency location defines one or more of the following: comprises
   a frequency hopping configuration of the Message 3 uplink transmission.

20. The method of claim 14 wherein the random access response includes configuration information of a control channel for a Message 4 downlink communication, the method further comprising:
   transmitting the control channel associated with the Message 4 downlink communication to the wireless terminal based on the configuration information; and transmitting the Message 4 downlink communication to the wireless terminal based on the control channel.

21. The method of claim 20 wherein the configuration information includes at least one of a time and a frequency resource definition that provides at least one of the following:
(a) a starting subframe among a set of subframes that carries the control channel associated with the Message 4 downlink communication;
(b) a number of repetitions across subframes for carrying the control channel;
(c) a frequency location in a subframe for the control channel, where the frequency location is provided by a narrowband index or a PRB pair index;
(d) a number of PRB pairs that are used for the control channel;
(e) a resource block assignment information of the control channel; and
(f) a frequency hopping configuration of the control channel.

22. The method of claim 14 wherein the random access response further includes a timing advance command and a temporary identification for the wireless terminal, and wherein the UL grant is included between the timing advance command and the temporary identification for the wireless terminal.

23. The method of claim 22 wherein the random access response includes six octets, wherein the timing advance command is included in a portion of a first of the six octets and a portion of a second of the six octets, wherein the UL grant is included in a portion of the second of the six octets and in third and fourth octets of the six octets, and wherein the temporary identification for the wireless terminal is included in fifth and sixth octets of the six octets.

24. The method of claim 14 wherein the random access response further includes a timing advance command, a temporary identification for the wireless terminal, and a modulation and coding scheme for the Message 3 uplink communication.

25. The method of claim 14 wherein receiving the random access preamble comprises receiving the random access preamble via a physical random access channel (PRACH), and wherein transmitting the random access response comprises transmitting the random access response via a physical downlink shared channel (PDSCH).

26. A wireless terminal comprising:
a transceiver configured to provide wireless communication with a node of a radio access network (RAN); and
a processor coupled with the transceiver, wherein the processor is configured to transmit and receive communications to and from the node through the transceiver, and wherein the processor is configured to:
transmit a random access preamble of a random access procedure through the transceiver to a node of a radio access network (RAN) and
receive a random access response (RAR) of the random access procedure from the node of the radio access network through the transceiver after transmitting the random access preamble, wherein the random access response includes an Uplink (UL) grant for a Message 3 uplink communication of the random access procedure, wherein the UL grant includes:
a time domain configuration associated with the Message 3 uplink communication, wherein the time domain configuration includes at least one of (a) a repetition factor that defines a number of repetitions across subframes for the Message 3 uplink communication, and (b) Transmission Time Interval (TTI) information for the Message 3 uplink communication; and
a frequency domain configuration associated with the Message 3 uplink communication, wherein the frequency domain configuration includes:
a resource block assignment that indicates Physical Resource Block (PRB) resources for the Message 3 uplink communication, wherein the resource block assignment includes (a) an UL narrowband index and (b) a set of PRB pairs within the narrowband.

27. The wireless terminal of claim 26 wherein the random access response includes the repetition factor for the Message 3 uplink communication of the random access procedure, wherein the processor is further configured to:
provide a number of repeated transmissions of the Message 3 uplink communication through the transceiver to the node of the radio access network wherein the number of repeated transmissions is based on the repetition factor for the Message 3 uplink communication.

28. The wireless terminal of claim 26 wherein the random access response includes information defining at least one of a time and a frequency location associated with the Message 3 uplink communication, wherein the processor is further configured to:
provide transmission of the Message 3 uplink communication through the transceiver based on the information defining at least one of the time and the frequency location from the random access response.

29. The wireless terminal of claim 26 wherein the random access response includes a configuration information of a control channel for a Message 4 downlink communication, wherein the processor is further configured to:
receive the control channel associated with the Message 4 downlink communication through the transceiver based on the configuration information, and
receive the Message 4 downlink communication from the node through the transceiver based on the control channel.

30. A node of a wireless communication network, the node comprising:
a transceiver configured to provide wireless communication with a-wireless terminal (UE) in a coverage area of the node; and
a processor coupled to the transceiver, wherein the processor is configured to transmit and receive communications to and from the wireless terminal through the transceiver, wherein the processor is configured to:
receive a random access preamble of a random access procedure from the wireless terminal through the transceiver; and
transmit a random access response (RAR) of the random access procedure through the transceiver to the wireless terminal responsive to receiving the random access preamble, wherein the random access response includes an uplink (UL) grant for a Message 3 uplink communication of the random access procedure, wherein the UL grant includes:
a time domain configuration associated with the Message 3 uplink communication, wherein the time domain configuration includes at least one of (a) a repetition factor that defines a number of repetitions across subframes for the Message 3 UL communication and (b) Transmission Time Interval (TTI) information for the Message 3 UL communication; and a frequency domain configuration associated with the Message 3 uplink communication, wherein the frequency domain configuration includes:

a resource block assignment that indicates Physical Resource Block (PRB) resources for the Message 3 uplink communication, wherein the resource block assignment includes (a) an UL narrowband index and (b) a set of PRB pairs within the narrowband.

31. The node of claim 30 wherein the random access response includes the repetition factor for the Message 3 uplink communication of the random access procedure, wherein the processor is further configured to:

receive a number of repeated transmissions of the Message 3 uplink communication from the wireless terminal through the transceiver wherein the number of repeated transmissions is based on the repetition factor for the Message 3 uplink communication.

32. The node of claim 30 wherein the random access response includes information defining at least one of a time and a frequency location associated with a Message 3 uplink communication, wherein the processor is further configured to:

receive a Message 3 uplink communication through the transceiver based on the information defining at least one of the time and the frequency location from the random access response.

33. The node of claim 30 wherein the random access response includes configuration information of a control channel for a Message 4 downlink communication, wherein the processor is further configured to:

transmit the control channel associated with the Message 4 downlink communication through the transceiver to the wireless terminal based on the configuration information; and transmit the Message 4 downlink communication through the transceiver to the wireless terminal based on the control channel.

* * * * *

UNITED STATES PATENT AND TRADEMARK OFFICE
CERTIFICATE OF CORRECTION

PATENT NO. : 10,743,350 B2  
APPLICATION NO. : 15/316683  
DATED : August 11, 2020  
INVENTOR(S) : Tirronen et al.

Page 1 of 1

It is certified that error appears in the above-identified patent and that said Letters Patent is hereby corrected as shown below:

In the Specification

In Column 8, Line 46, delete "processor circuit 403" and insert -- processor circuit 303 --, therefor.

In Column 8, Line 54, delete "and "305")." and insert -- and "307"). --, therefor.

In the Claims

In Column 28, Lines 64-65, in Claim 5, delete "response and on the repetition factor" and insert -- response and/or based on the repetition factor --, therefor.

In Column 29, Line 15, in Claim 19, delete "comprises" and insert -- comprises: --, therefor.

In Column 30, Line 58, in Claim 8, delete "following: comprises" and insert -- following: --, therefor.

In Column 31, Line 55, in Claim 26, delete "(RAN) and" and insert -- (RAN); and --, therefor.

In Column 32, Line 47, in Claim 30, delete "a-wireless terminal (UE)" and insert -- a wireless terminal (UE) --, therefor.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*